Figure 7:
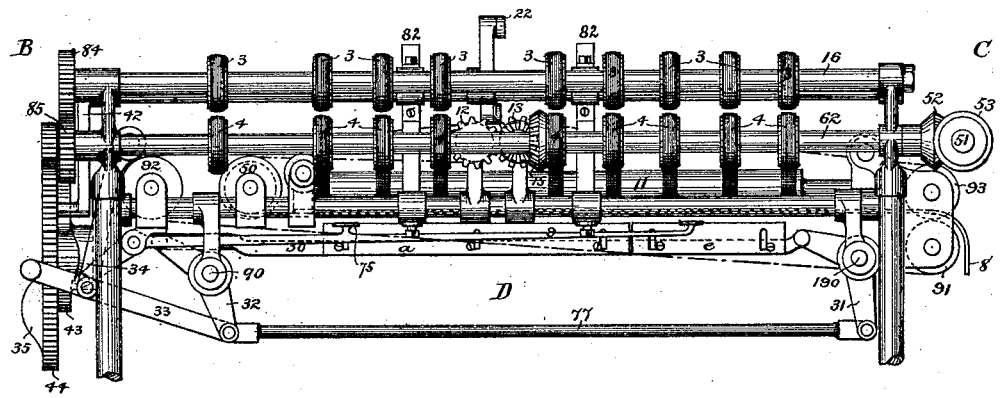

(No Model.) 8 Sheets—Sheet 1.
L. C. CROWELL.
FOLDING MACHINE.
No. 472,472. Patented Apr. 5, 1892.
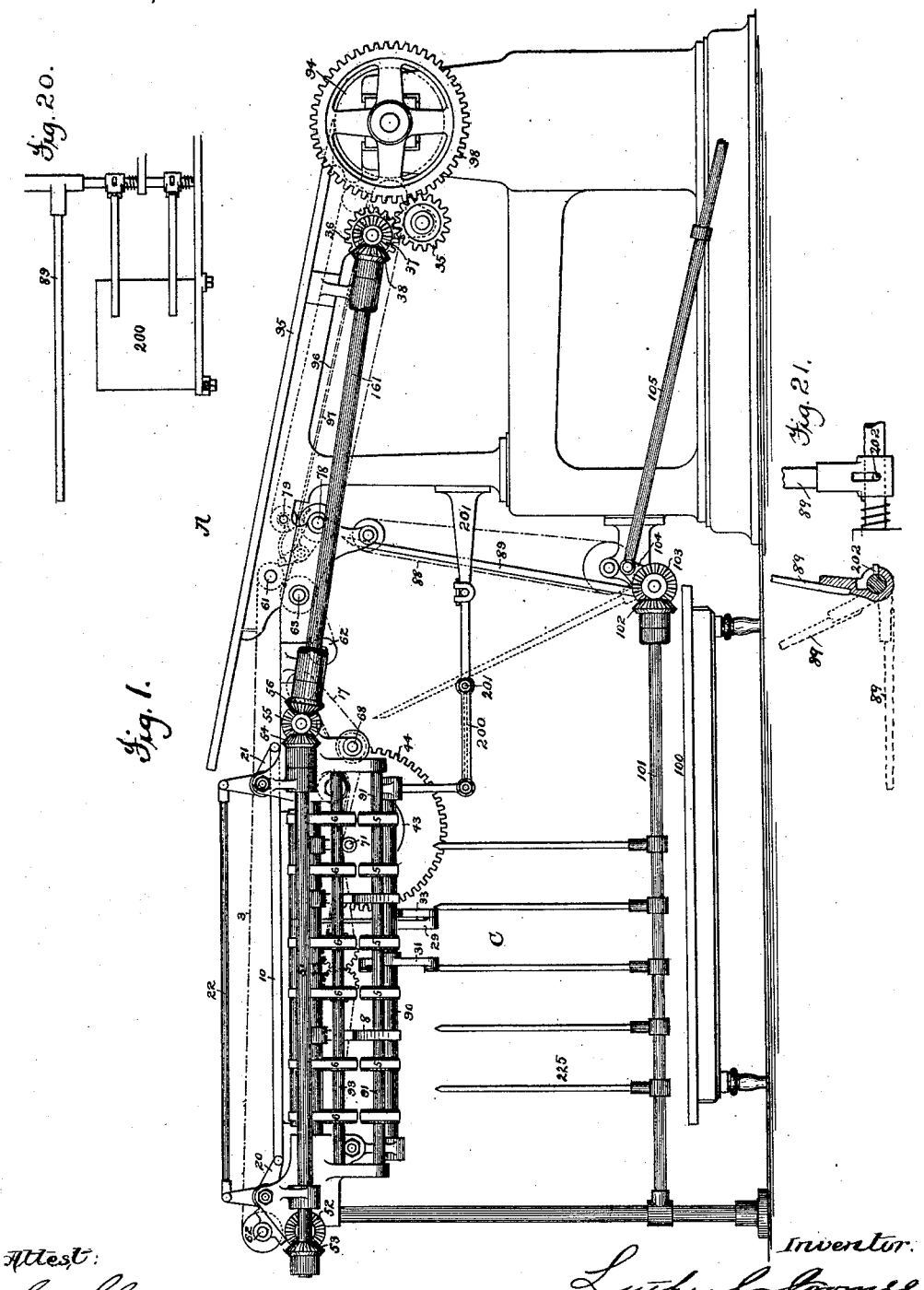
Attest:
Geo. H. Graham
Geo. H. Botts
Inventor:
Luther C. Crowell
by Munn & Philipp
Attys

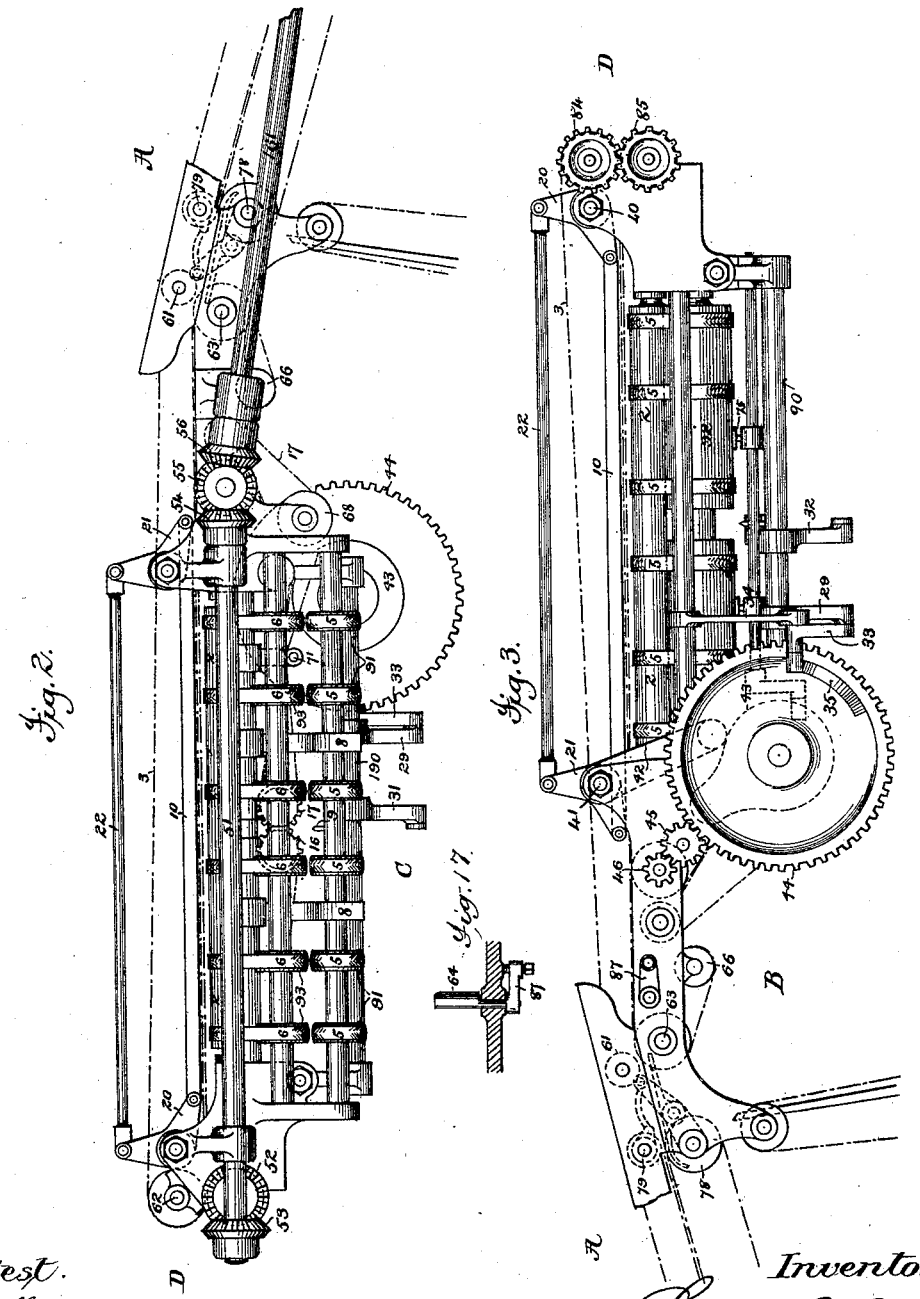

(No Model.)  8 Sheets—Sheet 3.
L. C. CROWELL.
FOLDING MACHINE.
No. 472,472. Patented Apr. 5, 1892.
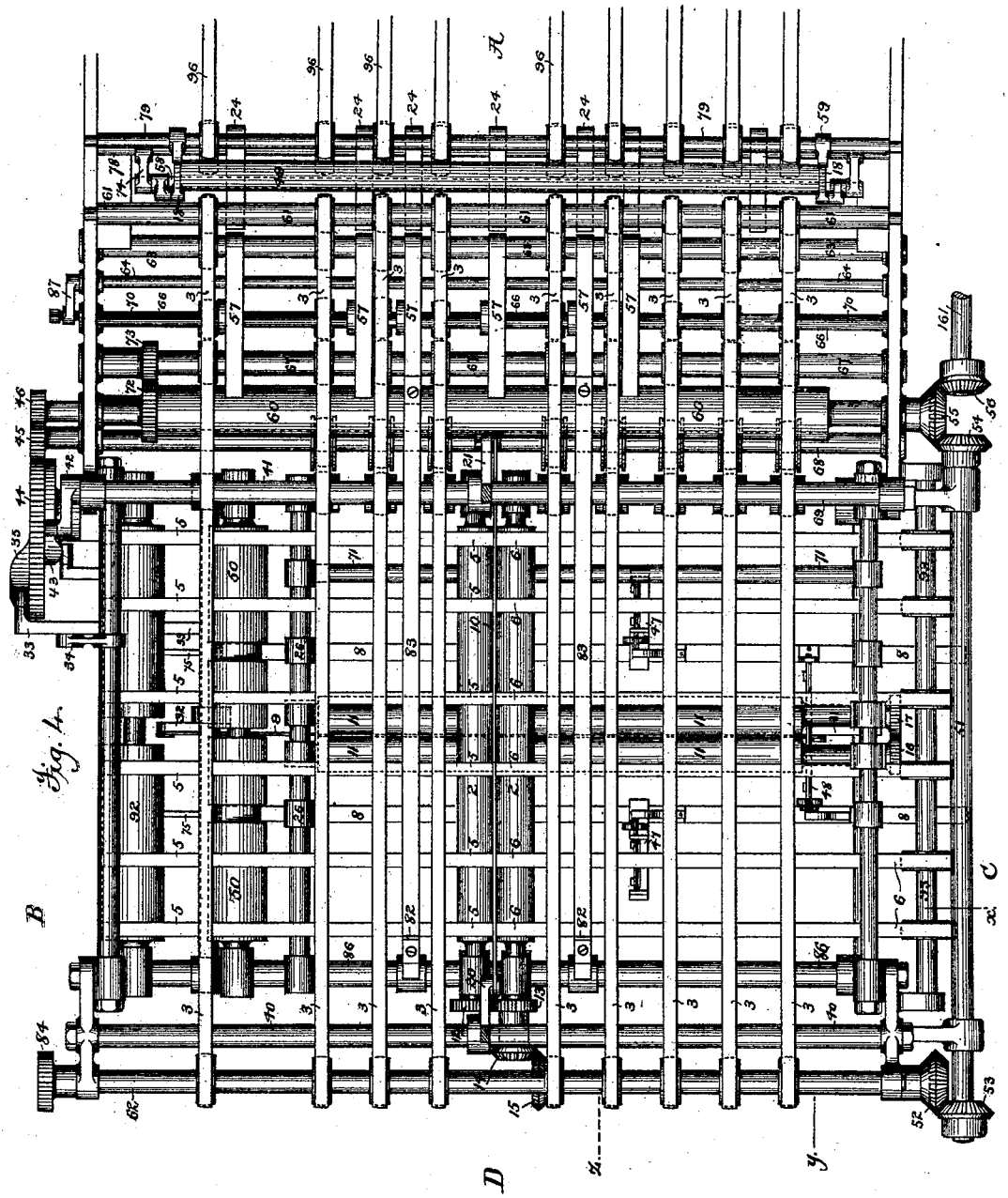

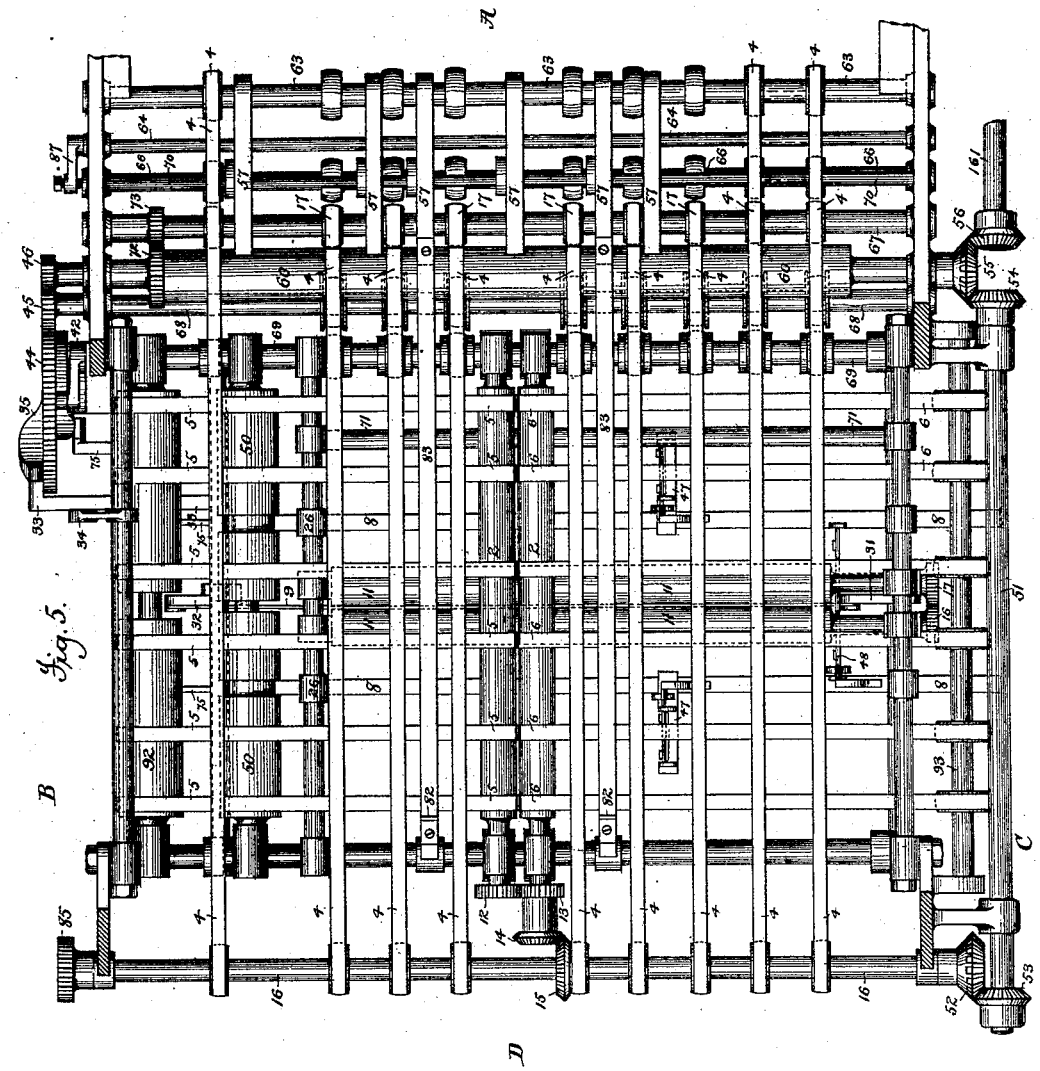

(No Model.) 8 Sheets—Sheet 5.
L. C. CROWELL.
FOLDING MACHINE.
No. 472,472. Patented Apr. 5, 1892.
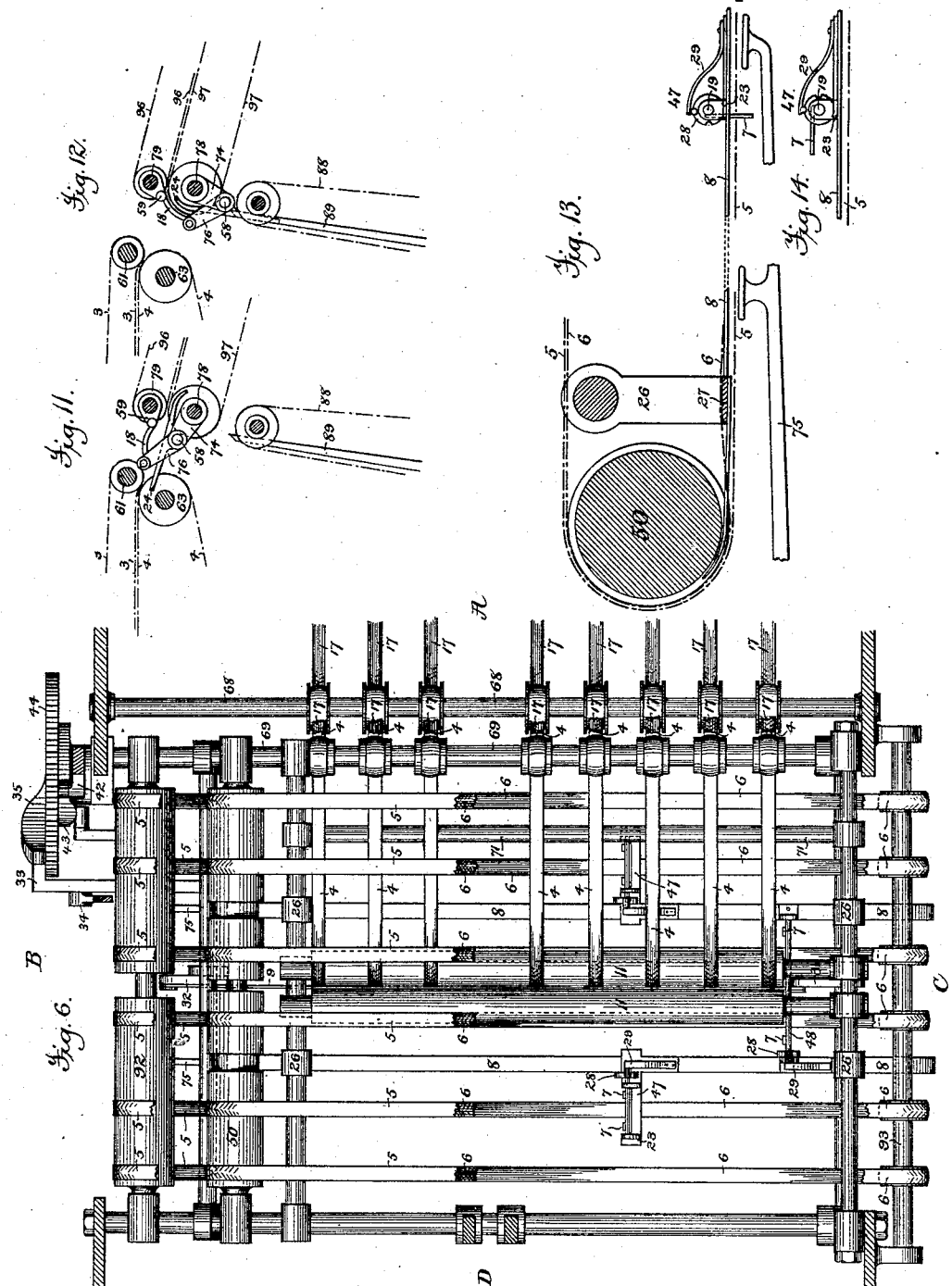
Attest:
Geo. H. Bott.
Geo. H. Graham
Inventor:
Luther C. Crowell
by Hinman & Sheiff
attys.

(No Model.) 8 Sheets—Sheet 6.

L. C. CROWELL.
FOLDING MACHINE.

No. 472,472. Patented Apr. 5, 1892.

Attest:
Geo. H. Botts.
Geo. H. Graham.

Inventor:
Luther C. Crowell
by Hanson & Shieff
attys.

(No Model.) 8 Sheets—Sheet 7.
L. C. CROWELL.
FOLDING MACHINE.
No. 472,472. Patented Apr. 5, 1892.
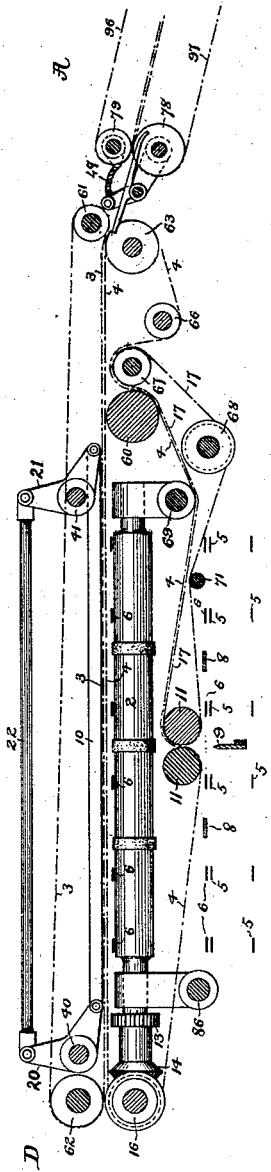
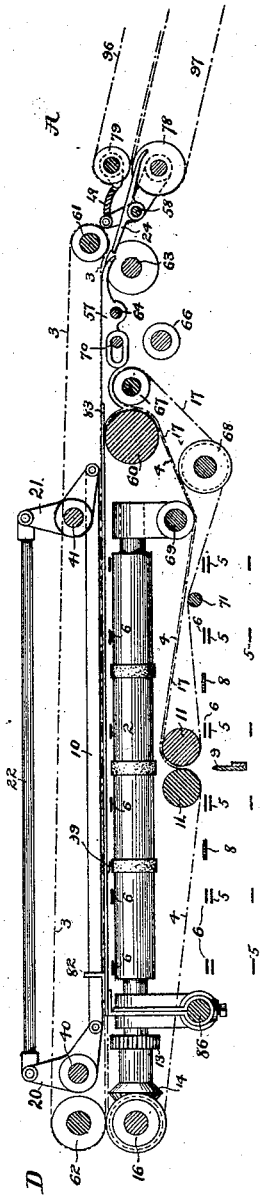
Attest:
Geo. H. Botts
Geo. H. Graham
Inventor:
Luther C. Crowell
by Munson & Phelps
attys.

(No Model.)  8 Sheets—Sheet 8.
L. C. CROWELL.
FOLDING MACHINE.
No. 472,472.  Patented Apr. 5, 1892.
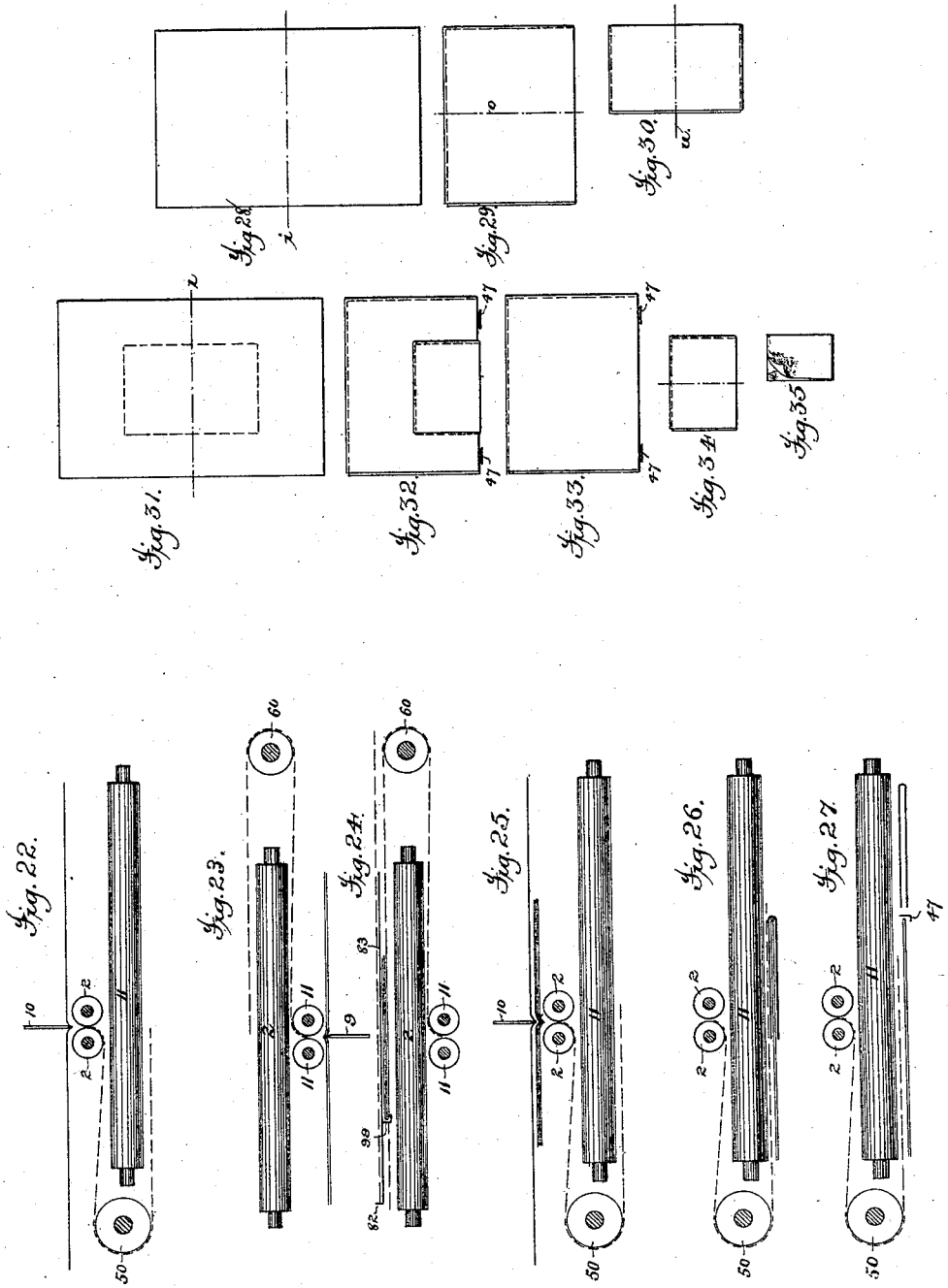

UNITED STATES PATENT OFFICE.

LUTHER C. CROWELL, OF BROOKLYN, ASSIGNOR, BY DIRECT AND MESNE ASSIGNMENTS, TO ROBERT HOE, STEPHEN D. TUCKER, THEODORE H. MEAD, AND CHARLES W. CARPENTER, OF NEW YORK, N. Y.

FOLDING-MACHINE.

SPECIFICATION forming part of Letters Patent No. 472,472, dated April 5, 1892.

Application filed March 27, 1885. Serial No. 160,180. (No model.)

*To all whom it may concern:*

Be it known that I, LUTHER C. CROWELL, a citizen of the United States, residing at Brooklyn, county of Kings, and State of New York, have invented certain new and useful Improvements in Folding-Machines, fully described and represented in the following specification and the accompanying drawings, forming a part of the same.

The improvements, stated in general terms, may be said to consist in combining with two sets of folding-rollers and two folding-blades sheet carrying and controlling devices whereby four folds may be imparted to each sheet; in combining with two sets of folding-rollers and two folding-blades means for delivering a sheet once, twice, three, or four times folded; in conveying twice-folded sheets from the secondary folding mechanisms to the primary folding mechanisms; in conveying twice-folded sheets from the secondary to the primary folding mechanisms and superimposing such folded sheets and an unfolded sheet; in stripping two superimposed folded sheets, whereby one may be delivered and the other further folded; in combining a folding-machine with the fly-delivery apparatus of a printing-machine and providing the same with means whereby sheets may be delivered flat, or folded one or more times.

The invention comprehends other combinations and improvements, fully hereinafter pointed out and claimed.

A practical means of delivering the printed sheets from a cylinder printing-machine either flat or folded has long been a desideratum, and means have been devised having this end in view. In the present improvements the folding-machine is so combined with the printing-machine as not to interfere with the usual operation of the means for delivering the sheets from the printing-machine flat upon a piling-table, and yet provide for such sheets being conveyed to the folding-machine, all of which will be fully understood from the following detailed description of a practical embodiment of the invention.

The improvements forming the invention are shown as embodied in that class of machine known as "vibrating" folders—that is, such as have folding-blades that vibrate in co-operation with folding-rollers, into the nip of which they introduce the sheet on the line of intended fold; but other forms of folding devices may be employed.

In describing the mechanisms, that side of the machine which is toward the delivery end of the printing-machine will be designated the "A" side, the opposite side will be called the "D" side, and the sides, respectively, at the right and left hands of the A side will be called the "B" and "C" sides, which designating letters are applied to the drawings.

Figure 8:
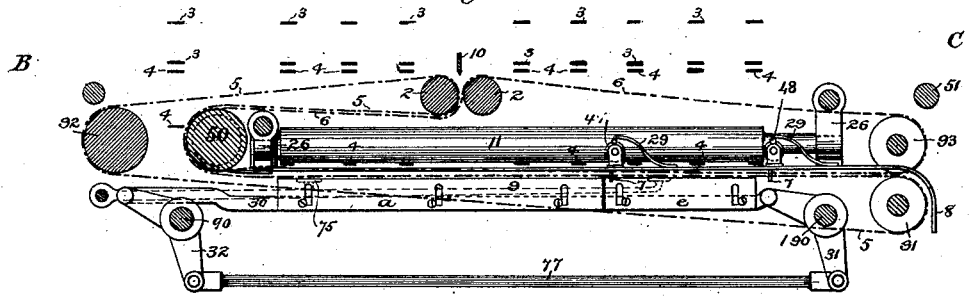
Figure 15:
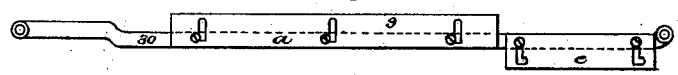
Figure 16:
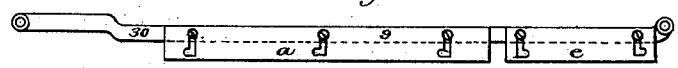
Figure 18:
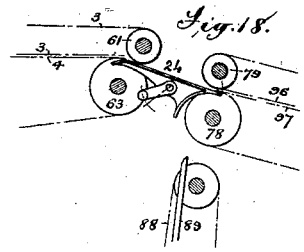

In said drawings, Figure 1 is a side elevation showing a portion of a cylinder printing-machine with this improved folder attached. Figs. 2 and 3 are opposite side elevations of the improved folder. Fig. 4 is a plan or top view of the folder. Fig. 5 is a plan or top view of the folder with the upper set of tapes and their carriers removed. Fig. 6 is a plan view of that portion of the folding mechanisms that lie below the plane of the lower face of the primary folding rolls. Fig. 7 is an end elevation of the folder. Fig. 8 is a transverse sectional elevation of the folder, as seen at the line $x$ of Fig. 4, looking toward the A side. Fig. 9 is a longitudinal sectional elevation as seen at the line $y$ of Fig. 4, looking toward the B side. Fig. 10 is a longitudinal sectional elevation as seen at the line $z$ of Fig. 4, looking toward the B side. Figs. 11 and 12 are sectional details of the parts composing the sheet-conduit between the printing-machine and folder, the controlling devices being adjusted in Fig. 11 to direct the sheets to the mechanisms of the folder, and in Fig. 12 to direct the sheets to the fly of the printing-machine. Fig. 13 is a sectional elevation of a carrying-roller and its tapes, sheet-conducting devices, and stops for conveying, directing, and stopping the primarily-folded sheet. Fig. 14 is a view of the said sheet-stop in another position. Figs. 15 and 16 are elevations of the secondary folding-blade in two positions of its adjustment. Fig. 17 illustrates the eccentric bearings of one of the shafts; Fig. 18, a modified construction of the conductors of the guide forming the sheet-conduit between the printing-machine and folder. Fig. 19 illustrates the rearward portion of the conductors 57 in one adjustment. Fig. 20 is a plan view of a portion of the sheet-flier and the piling-table for the folded product. Fig. 21 is a detail showing, in elevation and section, the manner of seating the movable fingers of the sheet-flier. Figs. 22 to 27, inclusive, are diagrams illustrating the course of the paper in its various positions and conditions. Figs. 28, 29, and 30 show, respectively, an unfolded sheet, a once-folded sheet, and a twice-folded sheet. Fig. 31 illustrates an unfolded sheet and a twice-folded sheet superimposed for simultaneous folding. Fig. 32 shows said sheets after being simultaneously folded. Figs. 33 and 34 show, respectively, the said simultaneously-folded sheets when separated from each other, and Fig. 35 illustrates a completed product that has received the four folds which this apparatus is capable of imparting to each sheet.

The principal elements of the folding-machine are an upper folding-blade 10, that co-operates with folding-rollers 2 2, and a lower folding-blade 9, that co-operates with folding-rollers 11. (See Fig. 2.) The upper folding-blade 10 and its rollers 2 2 are arranged parallel with the travel of the sheets as they run out of the printing-machine, while the lower folding-blade 9 and its rollers 11 11 are arranged at right angles thereto. The folding-blade 10 works downward and the folding-blade 9 works upward in performing the folding operation. The folding-rollers 2 2 and 11 11 are mounted in suitable bearings provided in the frame-work. The rollers 2 2 are provided at one end (see Figs. 4 and 5) with wheels 12 13, by which they are geared to run in unison, while one of the rollers carries a bevel-pinion 14, gearing with a bevel-wheel 15 on the shaft 16 (see Fig. 5) at the D side of the machine. This shaft 16 receives motion from the shaft 51 at the C side of the machine, to which it is geared by bevel-pinions 52 53, said shaft 51 being in turn geared by bevel-wheels 54 55 to and driven by the carrying-roller 60, which latter is, through a bevel-pinion 56, driven by a side shaft 161 from the printing-machine. The upper folding-blade 10, which co-operates with the rollers 2 2, is a narrow knife-like blade pivoted at its opposite ends to bell-cranks 20 21, mounted on shafts 40 41, whereby it is given a compound vertical and longitudinal movement in the folding operation, and thus is made to travel with the paper during the beginning of that operation. Its actuating bell-cranks 20 21 are connected together, so as to move in unison, by a rod 22, and while the bell-crank 20 may rock on or with the shaft 40 the bell-crank 21 is fast to the shaft 41, and the latter is rocked by a rock-arm 42, that is actuated by a cam 43, whose driving-wheel 44 turns upon a stud and is driven in proper time by wheels 45 46, the latter being upon one end of the main carrying-roller 60. The lower folding-blade 9, which co-operates with the rollers 11 11, (see Figs. 15 and 16,) is made up of two parts $a$ $e$, adjustable on the carrying-bar 30, whereby one part $a$ may alone be in action, as in Fig. 15, or both parts $a$ $e$ may be in action, as in Fig. 8, or be out of action, as in Fig. 16. The carrying-bar for this folding-blade is pivoted to bell-cranks 31 32, tied together by a rod 77 and journaled on shafts 90 190, and a reverse upward movement is imparted to the said folding-blade by means of a rock-arm 29, fast on shaft 90, (see Fig. 3,) and a connecting-rod 33, supported by a swinging arm 34, and a cam 35, projecting from the outer face of the wheel 44.

The means for conveying the sheets over the first folding-rollers 2 2 consists of two sets of tapes, the upper set being best seen in Fig. 4 and the lower set in Fig. 5. The tapes 3, composing the upper set, (see Fig. 4,) run from pulleys on a shaft 61 and return over pulleys carried by a shaft 62. Of the lower tapes 4 the central ones run over the main carrying-roller 60 (see Fig. 10) and the margin-tapes run over pulleys on a shaft 63, (see Fig. 9,) while all of said tapes after moving out underneath the tapes 3 return over pulleys on the shaft 16, pass under one and over the other of the folding-rollers 11 11, thence under pulleys on a shaft 69, the central tapes returning to the roller 60 and the margin-tapes move in contact with said roller 60, thence run over pulleys on a shaft 67, pass under pulleys on a shaft 66, and return to the pulleys on the shaft 63. The roller 60 is driven and the tape-pulley shafts 16 and 62 are geared together by wheels 84 85, thus causing the tapes 3 4 to be driven in unison and the latter to drive the folding-rollers 11 11. Acting to form a pathway with the tapes 4 from the folding-rollers 11 11 to the pulleys on shaft 67 are auxiliary tapes 17, which run around one folding-roller 11, pass thence under pulleys on the shaft 69, bear against roller 60, and return over pulleys on shafts 67 68 and a roller 71, driving-power for said tapes being obtained from the roller 60 and pulley-shaft 67, which are geared together by wheels 72 73. Co-operating with these tapes 3 4 for controlling the sheets over the rollers 2 2 are thin bars 83, which are supported at their outer ends by spring-like brackets rising from a shaft 86, Fig. 10, and at their inner ends by two of the conductors 57. The brackets which support the outer ends of the bars 83 will yield sufficiently to permit the conductors 57 to be adjusted to different positions, as will be hereinafter explained. To the upper and under surfaces, respectively, of these bars 83 are secured stops or gages 82 99, which stops 82 are arranged to intercept all sheets carried over the rollers 2 2 above the bars 83, while the stops 99 will intercept all sheets carried over the rollers 2 2 below the bars 83. The thin bars 83 instead of being secured at one end to conductors 57 may be secured to a suitable bracket attached to the rod 70, in which case said bars 83 would be placed so as to make suitable connection by the side of the guard 57. These conductors 57 are supported on a rock-shaft 64 and on a rod 70, and all of them (six being shown) co-operate with the tapes 3 in forming the entrance portion of the main pathway for the sheets, and with the auxiliary tapes 17 in delivering certain sheets over the pulleys on shaft 67. The conductors are slotted so as to slide on the rod 70, and the shaft 64 passes through and turns in their tail ends. This shaft has eccentric-journals by which it is mounted to turn in bearings in the side frames (see Fig. 17) and at one end is provided with a rock-arm 87, by which it may be rocked to positions fixed by means of a set-screw. When the shaft 64 is rocked so as to carry these conductors into their forward position, as in Fig. 10, the pathway from the rollers 11 11 is continued over the pulleys on shaft 67, and when the conductors are adjusted in their rearward position, as in Fig. 19, said pathway is connected with the main pathway formed by the tapes 3 4.

A sheet-conducting pathway from the primary folding-rollers 2 2 to the secondary folding-rollers 11 11 is formed of tapes 5 6. (See Fig. 8.) Of these the tapes 5 run around one roller 2, thence around the bending-roller 50, thence underneath the folding-rollers 11, and return around pulleys on a shaft 91 and a roller 92. The tapes 6, running over the other folding-roller 2, pass beneath the companion folding-roller 2, thence around the roller 50, thence underneath folding-rollers 11, and return around pulleys on a shaft 93. With these tapes are arranged guides 8, which are narrow bars extending from the roller 50 (into recesses of which their curved ends project) outward beneath the rollers 11 11, and extend to a point beyond the pulleys on shafts 93 91, where their ends are curved down concentric with the pulleys on the latter shaft, with which and the tapes 5 they form a delivery for some of the sheets.

The guides 8 are supported by brackets, as 26, (see Figs. 8 and 13,) and between these brackets 26 is a connecting-bar 27, over which the central tapes 6 pass, so that they are raised slightly higher than the margin-tapes 6. The reason for this is: The guides 8 are supplied with gages or stops 47, arranged to arrest sheets at one point, and with a stop 48, arranged to arrest sheets at another point. These stops are all constructed alike, and each consists of a shaft 19, to which are attached fingers 7, long enough to extend across the pathway of the sheets. This shaft 19 is capable of turning in journals rising from a base-plate 23, (see Figs. 13 and 14,) which rests on top of the guides 8, and is provided with a notched disk 28, at one end, with which coacts a pawl 29, in retaining the fingers 7 in the vertical position shown in Fig. 13 to act as stops, or in the raised or inoperative position shown in Fig. 14.

The stops 47 47 are so situated as not only to act to arrest wide sheets, but to provide for the passage beyond them of narrow sheets, which latter the stops 48 act to arrest or allow to pass, according as they may be adjusted, and both sets of stops may be arranged to admit the passage of the wide sheets. To insure the arrest of said wide sheets when narrow sheets folded with wide sheets are to be stripped therefrom and separately delivered, as will be hereinafter explained, and when paper of a delicate texture is manipulated, it has also been found desirable to provide arresting devices for coacting with the head-stops 47, and operating to bring the sheet to a state of rest without buckling its forward edge. One means for accomplishing this may be sheet-arresting tail-stops. As shown, these are swinging toes or arms 75 that coact with the guides 8. There may be two or more of these toes 75, arranged on a common rock-shaft, to which motion is imparted by a rock-arm and a cam in the usual manner. Other similar means may be employed to effect the same result.

This folder is adapted to fold the product of an ordinary cylinder printing-machine wherein sheets are printed and perfected by feeding them a second time, the means for their flat delivery being an ordinary fly-frame. The delivery end of such a machine is shown in Fig. 1. Of its printing mechanisms only the impression-cylinder 94 is shown; but the feed-board 95, by which the sheets are fed to the printing mechanism, and the tapes 96 97, whereby the printed sheets are delivered, are illustrated. These delivery-tapes 96 97 convey the sheets between pulleys 78 79, and from thence may descend onto tapes 88, before a fly-frame 89, and be laid upon a piling-table 100.

The folder is arranged with respect to the delivery end of the printing-machine, so that its pulley-shafts 61 63 are a slight distance in advance of the delivery-tape pulleys 78 79, and its driving-shaft 161 is actuated by a wheel 98 on the shaft of the cylinder 94, through intermediates 35 36 and bevel-pinions 37 38, the gearing of the folding-rollers 2 2 and shaft 16 being preferably such as will impart a slightly-greater surface speed to that part of the folder than that at which the press runs, so that when the sheets are being folded sufficient working space may be provided between successive sheets. Between the delivery-tapes of the printing-machine and the conveying-tapes of the folder is arranged a sheet-conduit that is capacitated to guide sheets to the folder or to the fly-frame. This consists of conductors 24, that are secured to a swinging shaft 58, hung by rock-arms 74 to the shaft 78, and they have suitably-shaped ends that respectively enter the spaces between the pulleys on the shafts 63 78, and when arranged, as is best seen in Fig. 11, these conductors continue the pathway of the sheets from the tapes 96 97 to the tapes 3 4, and thus guide sheets from the printing-machine into the folder. These conductors may also act to guide the sheets to the fly when they are to be piled flat, and for this purpose are rocked into the position shown in Fig. 12. In order to insure more positively this guiding action to the fly-frame, a guide-plate 49 is provided, curved to coincide with the curved rear ends of the conductors 24, when the two are in the position shown in Fig. 12. This guide-plate (see Fig. 4) carries at each end an arm 18, that at the rear is jointed to an arm 59 on the shaft 79, and at the front is jointed to an arm 76, said arms 76 and 74 forming a toggle-lever. By this construction the movement of the conductors 24 downward carries with them the plate 49, and holds the same by frictional resistance in the relation they have in Fig. 12, wherein they constitute a pathway to guide the sheets from the tapes 96 97 down before the fly-frame. A contrary movement will carry these devices into the relation shown in Fig. 11, where they form a pathway to guide the sheets from the tapes 96 97 to the tapes 3 4.

It is practical to omit the plate 49 and its connecting devices by constructing the conductors as shown in Fig. 18, where the conductors 24 are mounted on a rock-shaft and have their ends curved so that by a slight tilting of them the two conducting operations will be performed.

Where the sheets vary in size the folder may be adjusted to operate upon smaller ones by moving the gages or stops 82 99 and 47 48, which are made adjustable on the bars 83 and conductors 8 for that purpose.

Assuming the conductors 24 to be adjusted as shown in Fig. 11, the fingers 7 of the stops 47 and 48 and blade 9 as shown in Figs. 8 and 13, and the conductors 57 as shown in Fig. 19, the operation will be as follows: Each successive sheet will be delivered to and carried by the tapes 3 4 outward over the folding-rollers 2 2 until its leading edge is arrested by the stops 82. The folding-blade 10 will then descend and fold said sheet by doubling it on the line $i$, Fig. 28, into the nip of said folding-rollers. As it emerges from these folding-rollers 2 the once-folded sheet will be conveyed by the tapes 5 6 around the roller 50 and be carried underneath the rollers 11 and above the folding-blade 9 and against the fingers of the stops 47, which course is indicated by dotted lines in Fig. 22. This once-folded sheet will then be folded by the blade 9 between the folding-rollers 11, passing between which it will be a second time folded on the line $o$, Fig. 25, at right angles to the first fold. As it emerges from the rollers 11 this sheet, which has been so reduced in width by the first fold as to extend between only the four pairs of tapes 17 4 at the center of the machine, will be carried rearward and directed around the roller 60 (see Fig. 23) by the conductors 57 and again entered above the folding-rollers 2, but beneath the guides 83, it being arrested by means of stops 99 on said guides in proper position (see Fig. 24) to be a third time folded on the line $u$ of Fig. 30 by the folding-blade 10. As the feed of sheets to the folder is constant, it follows, by the proper timing of the mechanisms, that when the twice-folded sheet, as in Fig. 30, passes beneath the guides 83 and takes its position above the folding-rollers 2 an unfolded sheet will be simultaneously entered from the printing-machine over said folding-rollers, so that the two sheets—one a twice-folded sheet and the other an unfolded sheet—will be superimposed between the tapes 3 4, as in Fig. 24, the guides 83 separating them. These sheets will then bear the relation to each other shown in Fig. 31, where the dotted lines represent the folded sheet beneath the unfolded sheet. Now when the folding-blade 10 again descends it doubles the superimposed sheets simultaneously on the line $i$ of Fig. 31 between the folding-rollers 2 2, and the two sheets are folded together, as in Fig. 32, as they pass between said rollers 2 2.

The secondary folding mechanism operates immediately after the primary folding mechanism, and it therefore follows, since the unfolded sheets are fed in regular succession to the primary folding mechanism, that the first and third sheets and the second and fourth sheets are the ones superimposed and folded together, and that when the primary folding mechanism is operating upon the superimposed second and fourth sheets the secondary mechanism is operating upon the first and third sheets, of which said third sheet is to be superimposed with the incoming fifth sheet, while the said first sheet is to be delivered as will presently appear.

The superimposed folded sheets, as in Fig. 32, pass outward beneath the folding-rollers 11 and above the folding-blade 9, (see Fig. 26,) and the once-folded sheet is arrested by contact with the stops 47, (see Fig. 4,) while the three-times-folded sheet, not meeting with obstruction at the point where the stops 47 are located, but being embraced between the center tapes 5 6, is carried onward by them until arrested by the stops 48. (See Figs. 4 and 27.) The separated once and thrice folded sheets are thus made to occupy the relative positions respectively shown in Figs. 33 34, which positions they reach before the folding operation is accomplished by the folding-blade 9; and when this folding-blade 9 operates its section $a$ doubles the once-folded sheet, and its section $e$ doubles the thrice-folded sheet simultaneously into the nip of the rollers 11, passing between which the once-folded sheet is doubled a second time, as in Fig. 30, and the thrice-folded sheet is doubled a fourth time, as in Fig. 35. The twice-folded sheet is conveyed by the tapes 17 4 and conductors 57 around the roller 60 and again enters above the folding-rollers 2 and beneath the guides 83, where it is superimposed with an unfolded sheet, the same as already described. The four-times folded sheet, being within the embrace of only the two margin-tapes 4 17 at the C side of the machine, is not directed over roller 60 by the conductors 57, but is delivered from between the tapes 4 17 over the pulleys 67, and may there be delivered a completed product by any convenient means. Thus each successive sheet receives four folds, the first and third and the second and fourth of which are simultaneously made by the devices.

If it is desired to impart but one fold to the sheets the folding-blade 9 is put out of action by adjusting it, as in Fig. 16, and the stops 47 48 are thrown out of action, as in Fig. 14. Thereupon each sheet once folded through the rollers 2 2 passes around the roller 50 and is conveyed by the tapes 5 6 and guides 8 over the pulleys 91 at the C side of the machine, and may there be delivered by a fly or any other ordinary means of piling sheets. If it is desired to impart but two folds to each sheet the $a$ portion of the folding-blade 9 is adjusted into active position, as shown in Fig. 15, and the stops 47 are adjusted to arrest said sheet. The conductors 57 are then adjusted in their forward position, as shown in Fig. 10, so as to direct the sheets downward over the pulleys 67, whereupon the twice-folded sheet will be delivered from said pulleys and may be laid by any common piling mechanism. If it is desired to impart but three folds to a sheet the folding-blade 9 has its $e$ portion thrown out of action, as in Fig. 15. The stops 47 remain in action and the stops 48 are thrown out of action, and the conductors 57 adjusted, as in Fig. 19. The sheet once folded between the rollers 2 is conveyed beneath the folding-rollers 11, there receives its second fold, as before described, passes around the roller 60, enters a second time above the rollers 2, receives its third fold simultaneously with the imparting of the first fold to an unfolded sheet, the two sheets passing from the rollers 2, and beneath the rollers 11 are stripped apart, as before described, and the thrice-folded sheet, instead of being arrested by the stops 48 to be a fourth time folded by the part $e$ of the folding-blade 9, passes outward between the tapes 5 6 and guides 8 and is delivered at the C side of the machine. These once and twice folded sheets will be delivered at the A side of the machine, and may be laid, by an arrangement of the fly of the printing-machine, upon the piling-table of that machine. The thrice and four times folded sheets are delivered at the C side of the machine, and may be laid by a fly arranged at that side of the machine, as in Fig. 1, upon the same piling-table.

Thus with two sets of the folding mechanisms and two delivery-conduits, sheets may be folded one, two, three, or four times, and be delivered. The arrangement of the fly-frame 225 for delivering the once and three times folded sheet differs in no material sense from the structure commonly employed. It is vibrated in the instance illustrated by means of a rock-shaft 101, which carries fingers and which is vibrated by means of bevel-pinions 102 103, a rock-arm 104, and a rod 105, cam-actuated or otherwise reciprocated to produce this result.

As here shown, the printing-press fly not only delivers the sheets from the printing-press flat upon the table 100, but may vibrate to its fullest extent to pile both the twice and four times folded sheets upon that table. As the four-times folded sheets are quite small it may be desirable to pile them at a point nearer their delivery from the folding-machine, and for that purpose Fig. 20 illustrates such four-times folded sheets as delivered upon a hanging frame 200 by the fly-frame 89, supported in part by a bracket 201. This frame 200 is arranged to be detached when the fly is to deliver sheets flat; and for co-operation with it, such of the fingers of the fly-frame 89 as are abreast the passage-way for the four-times-folded sheet are hung to their shaft by springs, as shown in Figs. 20 and 21, the attachment being such that the fingers are normally pressed forward and held so as to remain aligned with the other fingers; but may be arrested during a forward movement when brought into contact with the bar 201 of the frame 200, while the remaining fingers continue their forward movement, as when flying sheets flat. In the return movement of the fly the fingers again come into alignment with a stop 202 on the fly-frame shaft, and cause it to take up the spring pressure thereon and thus move all the fly-fingers back to their normal position.

Of course the folding-blades, though here described as of the vibrating type, may have substituted for them other means for projecting them into the nip of their folding-rollers. Thus a rotary mechanism now well understood in this art could be substituted. An air-blast might be the equivalent of a blade. In short, any of the means coacting with rollers for doubling sheets into rollers or equivalent coacting devices might be substituted for the mechanism herein shown.

It will be observed that the folding-rollers and their coacting folding-blades and also the principal bending-rollers are adjustably secured to the frame-work. Also that the rollers 2 2 are provided with elastic bands that form their nipping-points. By their action the folded sheet which is in contact with their surfaces in the process of folding is caused to enter the nip of the rolls slightly in advance of the other sheet, and the separation of the sheets is made more certain. To avoid confusion these bands are only shown in Figs. 9 and 10.

This separation of the sheets may be aided by coacting nipping-rolls embracing center tapes with a tail-stop.

When sheets receive their first impression, if it is desired to deliver them flat upon the piling-table 100 the pinion 35 may be removed to render the folding-machine inoperative. When it is desired to connect the folding-machine with the printing-machine, so that both shall co-operate to print and fold sheets, as when the sheets receive their last impression and are to be folded, the cylinder 94 will be turned until the bed or form has been moved to a predetermined position, and the cam-wheel 44 of the folding-machine will also be turned to a given position to bring the folding and printing mechanism into proper correlation when the pinion 35 will be moved on its stud to mesh with the wheels 98 and 36.

What is claimed is—

1. The combination, with the delivery of a printing-machine and the delivery of a folding-machine, of a fly-frame adapted to pile sheets from either, and means, substantially as described, for conveying sheets from the printing-machine to the folder or directly to said fly-frame, substantially as described.

2. The combination, with a pair of folding-rolls and a folding-blade, of sheet-conveying devices arranged to take the folded sheet from the rolls, carry it around the ends of the rolls, and return it in position to be again folded between the rolls by the same blade, substantially as described.

3. In a folding-machine, the combination, with two pairs of folding-rolls and two folding blades arranged to operate successively upon the sheet, of sheet-conveying devices arranged to take the folded sheet from the first rolls and present it to the second rolls and blade to receive a second fold, and take it from the second rolls and re-present it to the first rolls and blade to receive a third fold, substantially as described.

4. In a folding-machine, the combination, with two pairs of folding-rolls and two folding-blades arranged to operate successively upon the sheet, of sheet-conveying devices arranged to take the folded sheet from the first rolls and present it to the second rolls and blade to receive a second fold, and take it from the second rolls, re-present it to the first rolls and blade to receive a third fold, and then deliver it from the machine, substantially as described.

5. In a folding-machine, the combination, with two pairs of folding-rolls and two folding-blades arranged to operate upon the sheet successively, of sheet-conveying devices arranged to take the folded sheet from the first rolls and present it to the second rolls and blade to receive a second fold, and take it from the second rolls and re-present it to the first rolls and blade to receive a third fold, and take it from the first rolls and re-present it to the second rolls and blade to receive a fourth fold, substantially as described.

6. In a folding-machine, the combination, with two pairs of folding-rolls and two folding-blades arranged to operate upon the sheet successively, of sheet-conveying devices arranged to take the folded sheet from the first rolls and present it to the second rolls and blade to receive a second fold, and take it from the second rolls and re-present it to the first rolls and blade to receive a third fold, and take it from the first rolls and re-present it to the second rolls and blade to receive a fourth fold, and then deliver it from the machine, substantially as described.

7. In a folding-machine, the combination, with a pair of folding-rolls and a folding-blade, of sheet-conveying devices arranged to take the folded sheet from the rolls and return it in position to be again folded between the rolls, and sheet-conveying devices arranged to advance another sheet and present it to the rolls in position to be superimposed with the previously-folded sheet, so that the two sheets will be folded together between the rolls, substantially as described.

8. In a folding-machine, the combination, with a pair of folding-rolls and a folding-blade, and means for presenting two sheets of different dimensions to said rolls and blade, so that they will be folded together one within the other, of sheet-conveying devices for taking the folded sheet from the rolls, and stops for arresting the larger sheet while the smaller is allowed to pass forward, substantially as described.

9. In a folding-machine, the combination, with a pair of folding-rolls and a folding-blade, and stops for arresting said sheets in different positions, and means for presenting two sheets to said rolls and blade, one in advance of the other, so that both will be folded simultaneously, of sheet-conveying devices arranged to convey one of said sheets to other folding mechanism while the other sheet is allowed to pass directly from the machine, substantially as described.

10. In a folding-machine, the combination, with two pairs of folding-rolls and two folding-blades arranged to operate successively upon the sheet, of sheet-conveying devices arranged to take the folded sheet from the first rolls and present it to the second rolls and blade to receive a second fold and take it from the second rolls and re-present it to the first rolls and blade in position to be superimposed with another sheet simultaneously presented to said rolls for the first time, so that the two sheets will be folded together, the first sheet receiving a third fold, substantially as described.

11. In a folding-machine, the combination, with two pairs of folding-rolls and two folding-blades arranged to operate successively upon the sheet, of sheet-conveying devices arranged to take the folded sheet from the first rolls and present it to the second rolls and blade to receive a second fold and take it from the second rolls and re-present it to the first rolls and blade in position to be superimposed with another sheet simultaneously presented to said rolls for the first time, so that the two sheets will be folded together, the first sheet receiving a third fold, and stops arranged to arrest the once-folded sheet in position to receive a second fold from the second rolls and blade while the thrice-folded sheet is allowed to pass forward, substantially as described.

12. In a folding-machine, the combination, with two pairs of folding-rolls and two folding-blades arranged to operate successively upon the sheet, of sheet-conveying devices arranged to take the folded sheet from the first rolls and present it to the second rolls and blade to receive a second fold and take it from the second rolls and re-present it to the first rolls and blade in position to be superimposed with another sheet simultaneously presented to said rolls for the first time, so that the two sheets will be folded together, the first sheet receiving a third fold, and stops arranged to arrest the once-folded sheet in position to receive a second fold from the second rolls and blade, while the thrice-folded sheet is allowed to pass forward between the rolls and blade to a position in advance of the once-folded sheet, to receive a fourth fold, substantially as described.

13. The combination, with the folding-rolls 2 and blade 10, of the bars 83, and sheet-conveying devices arranged to present the sheet to the rolls above said bars in position to be folded and to take the folded sheet from the rolls and re-present it beneath the bars in position to be folded again by said rolls and blade, substantially as described.

14. The combination, with the folding-rolls 2 and blade 10, of the bars 83, and sheet-conveying devices arranged to present the sheet to the rolls above said bars in position to be folded, and to take the folded sheet from the rolls and re-present it beneath the bars in position to be folded again by said rolls and blade, and a switch mechanism for directing the sheet to the rolls beneath the bars or directing it from the machine, substantially as described.

15. The combination, with the folding-rolls 2 and blade 10, of the bars 83 and sheet-conveying devices arranged to present the sheet to the rolls above said bars in position to be folded, and to take the folded sheet from the rolls and re-present it beneath the bars in position to be folded a second time, a switch mechanism for directing the sheet to the rolls beneath the bars or directing it from the machine, and the stops 82 99 on opposite sides of the bars for stopping the sheets, substantially as described.

16. The combination, with folding-rolls 2, folding-blade 10, folding-rolls 11, and folding-blade 9, of center tapes 4, co-operating tapes 17, roller 60, and conductors 57, whereby sheets are a second time conducted to folding-rolls 2 or delivered after leaving the folding-rolls 11, substantially as described.

17. The combination, with folding-rolls 2, folding-blade 10, folding-rolls 11, and folding-blade 9, of the center and margin tapes 4, co-operating tapes 17, roller 60, and conductors 57, substantially as described.

18. The combination, with the folding-rolls 2, blade 10, folding-rolls 11, and blade 9, of tapes for conveying the sheets from the former rolls to the latter, and the stops 47 48, arranged above the latter rolls at different points lengthwise of the rolls and at different distances from the rolls, so that the wider sheet will be arrested and the narrower allowed to pass, substantially as described.

19. A folding-blade constructed in sections, one or all of which are adjustable into or out of operative position, substantially as described.

20. The combination, with the folding-rolls 11, of the folding-blade 9, having two adjustable sections $a$ $e$, and the stops 47, substantially as described.

21. The combination, with a folding-blade, of oscillating arms pivoted on a stationary part of the machine to oscillate in a plane parallel with the blade, and on which the blade is pivotally mounted, so as to be supported and carried thereby, substantially as described.

22. The combination, with oscillating bell-cranks 20 21, of rod 22, connecting one arm of said bell-cranks, and blade 10, pivotally mounted on the other arms of said bell-cranks, substantially as described.

23. The combination, with shafts 40 41, of bell-cranks 20 21, rod 22, connecting one arm of said bell-cranks, blade 10, pivotally mounted on the other arms of said bell-cranks, and means for rocking one of said shafts, substantially as described.

24. The combination, with the primary folding mechanism and its stops 82 99, of the secondary folding mechanism and its removable stop-fingers 47, and sheet-carrying devices, substantially as described, whereby sheets may be once folded by each folding mechanism and be delivered a second time to the primary folding mechanism in proper register to receive a third fold or be delivered with two folds, substantially as described.

25. The combination, with the delivery-tapes and fly of the printing-machine, and the tapes 3 4 of the folding-machine, of the conductors 24, and guide-plate 49, and means for adjusting them to conduct sheets to the fly or folding-machine, substantially as described.

26. The combination of a folding-machine having two deliveries for its folded product, with a printing-machine, its fly-frame, and an auxiliary fly-frame, substantially as described.

27. The combination, with a cylinder press, its fly 89 and piling-table 100, of a folding-machine having a separate fly 225, arranged to deposit the folded sheets on the same table, and a switch mechanism for directing the sheets from the press either directly to the fly 89 or to the folding-machine, substantially as described.

In testimony whereof I have hereunto set my hand in the presence of two subscribing witnesses.

LUTHER C. CROWELL.

Witnesses:
T. H. PALMER,
GEO. H. GRAHAM.